United States Patent [19]

Shimoda

[11] Patent Number: 5,519,871
[45] Date of Patent: May 21, 1996

[54] DATA SAVE APPARATUS FOR A BATTERY-POWERED DATA PROCESSING UNIT

[75] Inventor: Yuji Shimoda, Kawasaki, Japan

[73] Assignee: Fujitsu Limited, Kawasaki, Japan

[21] Appl. No.: 243,532

[22] Filed: May 16, 1994

Related U.S. Application Data

[63] Continuation of Ser. No. 850,843, Mar. 13, 1992, abandoned.

[30] Foreign Application Priority Data

Mar. 18, 1991 [JP] Japan ................... 3-015520
Aug. 20, 1991 [JP] Japan ................... 3-065641

[51] Int. Cl.⁶ .................................. G06F 1/00
[52] U.S. Cl. .................. 395/750; 364/DIG. 1; 364/273; 364/273.1; 364/273.4
[58] Field of Search .................. 395/750; 364/707; 365/222–230

[56] References Cited

U.S. PATENT DOCUMENTS

| | | | |
|---|---|---|---|
| 3,597,560 | 7/1969 | Norden | 200/400 |
| 3,959,778 | 5/1976 | Brette | 340/172.5 |
| 4,327,410 | 4/1982 | Patel et al. | 395/750 |
| 4,458,307 | 7/1984 | McAnlis et al. | 395/750 |
| 4,733,265 | 3/1988 | Haraguchi et al. | 354/484 |
| 5,033,882 | 7/1991 | Vanderpool et al. | 400/120 |
| 5,121,359 | 6/1992 | Steele | 365/229 |
| 5,167,024 | 11/1992 | Smith et al. | 395/750 |
| 5,182,769 | 1/1993 | Yamaguchi | 379/387 |

*Primary Examiner*—Jack B. Harvey
*Assistant Examiner*—Ayaz R. Sheikh
*Attorney, Agent, or Firm*—Staas & Halsey

[57] ABSTRACT

A data save apparatus for a data processing unit including at least volatile storage and a battery housed in the data processing unit to supply power thereto, the data save apparatus predicts that the battery is about to be removed from the data processing unit and, based on the prediction, saves data stored in the volatile storage into non-volatile storage or volatile storage backed-up by another battery.

13 Claims, 10 Drawing Sheets

DATA SAVE APPARATUS FOR A BATTERY-POWERED DATA PROCESSING UNIT

This application is a continuation of U.S. patent application Ser. No. 07/850,843, filed Mar. 13, 1992, now abandoned.

BACKGROUND OF THE INVENTION

1. Field of the Invention

The present invention relates to a data save apparatus for a battery-powered data processing unit, such as a notebook personal computer, a word processor or a hand-held terminal.

Due to the remarkable development of such electronic devices as large-scale integrated circuits (LSIs) which have a high density of electronic parts and are low in power consumption, data processing units are becoming more and more light-weight and small-sized. Also, to make them portable, a battery is used for supplying power to such data processing units. However, if the battery is accidentally removed, data stored in volatile storage may be destroyed or lost when removal of the battery occurs during data processing. Then, the processing must be resumed from the very beginning after the battery is restored or replaced with a new one.

Accordingly, some effective and economical means to overcome such inconvenience is in great demand for a battery-powered data processing unit.

2. Description of the Related Art

Figure 1A:
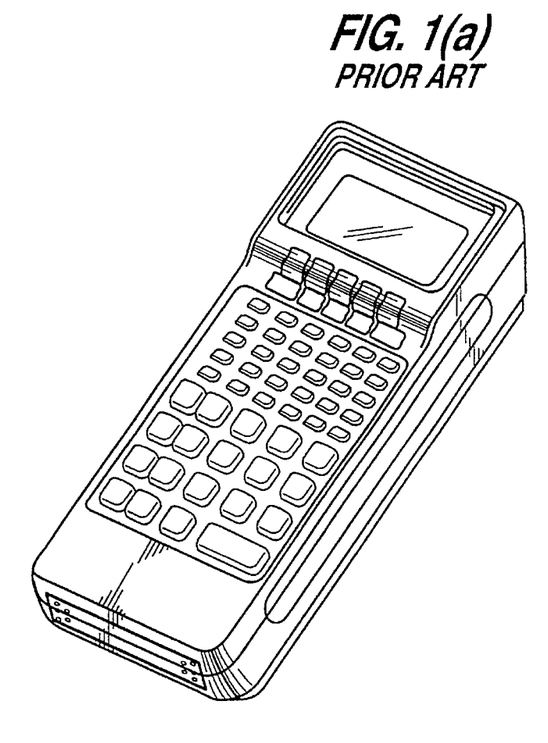
FIG. 1(a) is a front perspective view of a battery-powered data processing unit.
Figure 1B:
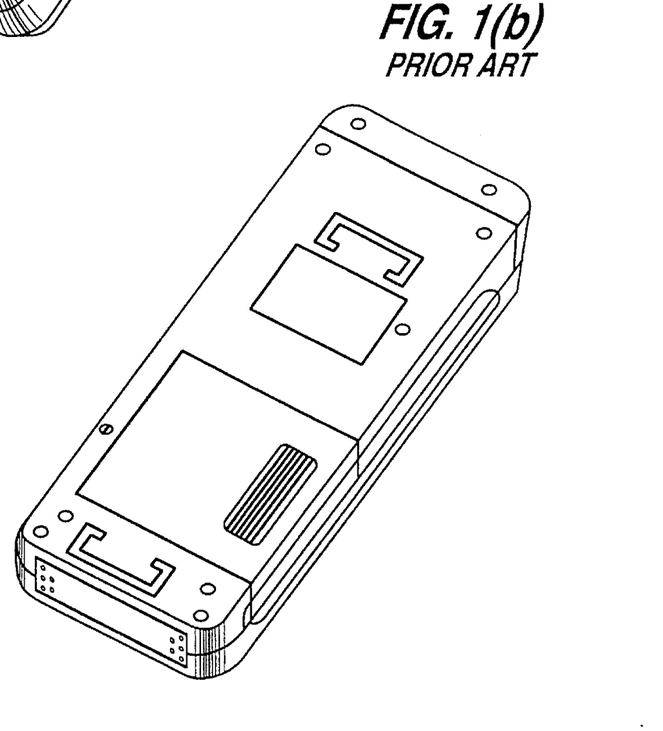
FIG. 1(b) is a rear perspective view of a battery-powered data processing unit.

FIGS. 1(a) and 1(b) show a battery-powered data processing unit (hereinafter simply called a data processing unit or a unit), an example of which is a hand held terminal (HHT) for a terminal input apparatus as disclosed in U.S. Pat. No. 4,773,032.

In a data processing unit, the following methods are used conventionally to avoid the above-mentioned inconvenience. The first method is to stipulate in a manual to take out the battery only after operating a power-off switch, which causes a data save operation to be performed and, after that, the power to be turned off. The data save operation is performed such that data stored in volatile storage is saved in a non-volatile storage or a magnetic disk, etc. The second method is explained with reference to FIGS. 2 and 3.

Figure 2:
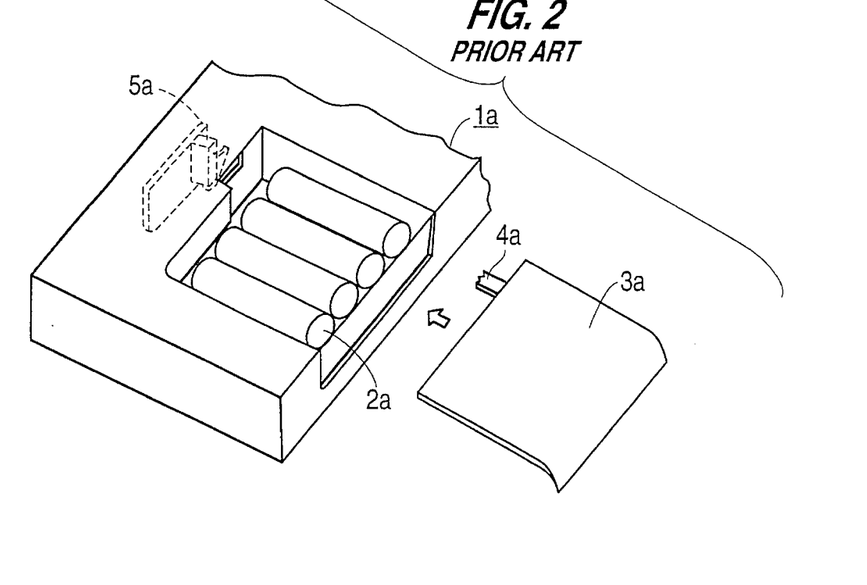
FIG. 2 is a perspective view of a housing for batteries and a cover of a data processing unit of the related art.
Figure 3:
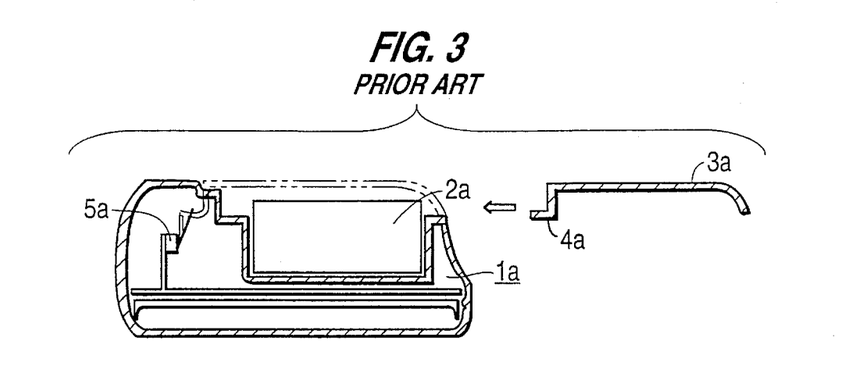
FIG. 3 is a sectional view of the battery housing and the cover shown in FIG. 2.

FIG. 2 is a perspective view of a housing for batteries and a cover of a data processing unit of the related art. FIG. 3 is a sectional view of the battery housing and the cover shown in FIG. 2.

A battery 2a is a "battery pack" with plural batteries wrapped in laminated vinyl chloride, for example.

A unit 1a is provided with a switch 5a. A cover 3a, which covers the battery pack 2a housed in the unit 1a, is provided with a projection 4a at an end. When the cover 3a is put in position, the switch 5a is pressed by the projection 4a and turns on, i.e., closes. Thus, the switch 5a detects the presence of the cover 3a and that the battery 2a is present and mounted in the unit 1a. A switching transition of the switch 5a from on to off causes a security operation to be performed to save the current status, including register contents and program status, into non-volatile storage, for example, so that the processing which will be suspended by the removal of the battery 2a from the unit 1a, can be resumed later.

When the battery 2a needs to be replaced for a so-constructed unit 1a, e.g., for periodic maintenance or when a power supply voltage drop is detected, data stored in volatile storage can be saved in the non-volatile storage during the period from the time the cover 3a is removed until the battery 2a is taken out, so that the processing, which is thereby suspended, can be resumed later by restoring the data saved.

However, when the unit 1a is dropped accidentally and the cover 3a comes off suddenly by the shock, for example, the power supply is cut off almost at the same time as the absence of the cover 3a is detected by the switch 5a.

Therefore, a problem occurs in that, in such cases, the unit 1a does not have enough time to perform the data save operation, thereby destroying or losing data in the process.

SUMMARY OF THE INVENTION

It is an object of the present invention to provide a data save apparatus for a battery-powered data processing unit which can effectively and economically save or preserve data required for resuming processing which has been suspended by the removal of a battery, e.g., when the battery is replaced.

It is another object of the present invention to provide a mechanism for a battery-powered data processing unit which can effectively and economically predict that a battery is about to be removed, in order to save or preserve the data required.

To achieve the above and other objects, the present invention predicts when the power supply, which is replaceable and supplies power to the data processing unit, is going to be removed and, based on the prediction, saves data stored in a first volatile storage (i.e., a memory) in a second storage (i.e., a memory which is capable of holding data stored therein unchanged when power is cut from the power supply).

BRIEF DESCRIPTION OF THE DRAWINGS

Throughout the above-mentioned drawings, identical reference numerals are used to designate the same or similar component parts.

DESCRIPTION OF THE PREFERRED EMBODIMENTS

Figure 4:
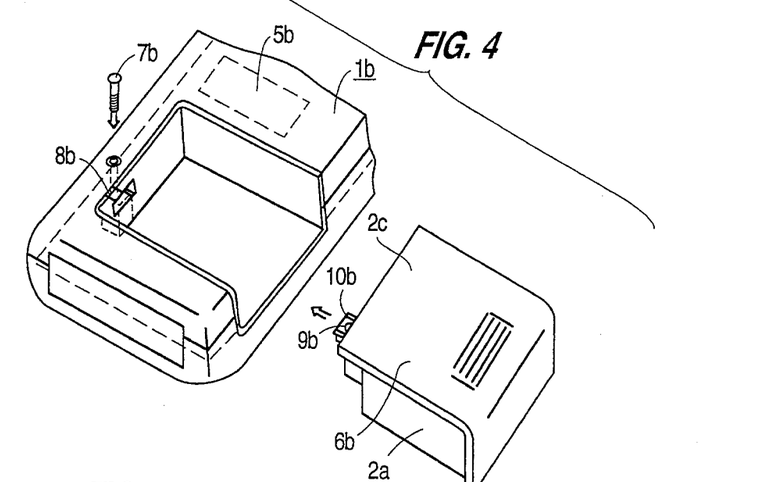
FIG. 4 is a perspective view of a battery housing and a cover of a data processing unit of the present invention.
Figure 5:
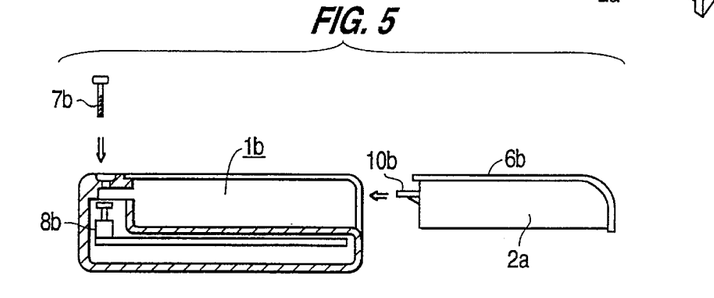
FIG. 5 is a side view of the battery housing and the cover shown in FIG. 4.

FIG. 4 is a perspective view of a battery housing and a cover of a data processing unit of the present invention. FIG. 5 is a sectional view of the battery housing and the cover shown in FIG. 4.

As shown in FIGS. 4 and 5, a unit 1b is provided with a cover 6b for covering a battery 2a housed in the unit 1b, a screw (male screw) 7b for fastening the cover 6b to the unit 1b, and a detector switch 8b which turns on and off depending on how far, into the unit 1b, the screw 7b is driven. The cover 6b for covering the battery 2a has at the interior end 2c thereof a projection 10b with a female screw 9b tapped for having the screw thereof 7b driven therein. Logic circuit 5b includes such circuits as a central processing unit (CPU), memory, and an input-output controller to control the functions of the unit 1b.

Figure 6:
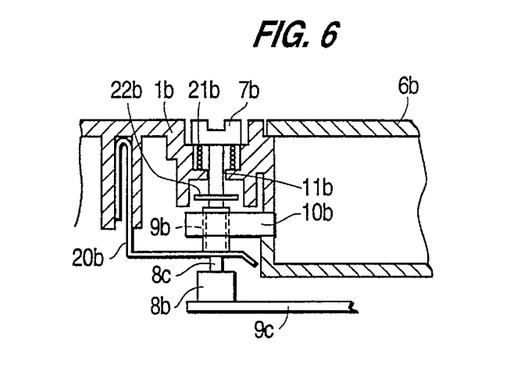
FIG. 6 is a detailed sectional view of a mechanism for detecting the presence of a battery.
Figure 7:
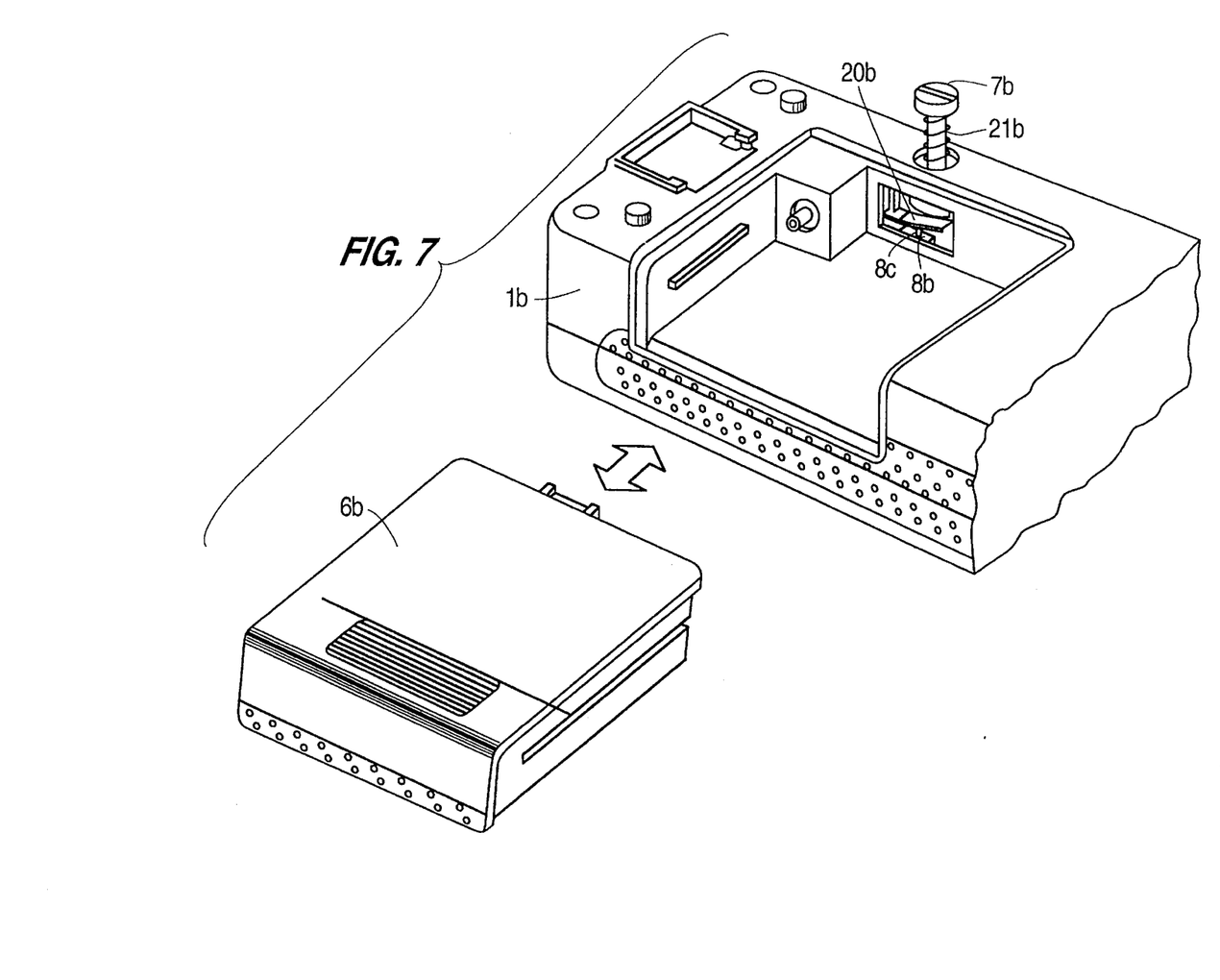
FIG. 7 is a perspective view of the mechanism shown in FIG. 6.

FIG. 6 is a detailed sectional view of a mechanism for detecting the presence of a battery. FIG. 7 is a perspective view of the mechanism shown in FIG. 6.

When the cover 6b is inserted into the unit 1b to cover the battery 2a, the projection 10b is positioned over the detector switch 8b, which is mounted on a printed circuit board 9c. When the screw 7b is driven into the female screw 9b through a hole 11b which is provided in the body of the unit 1b, the cover 6b is screwed tightly to the body of the unit 1b. At the same time, the point of the screw 7b presses down on an actuating device 8c of the detector switch 8b through a leaf spring 20b and, eventually, the detector switch 8b turns on. The actuating device 8c is pressed down by the point of the screw 7b and biased upwardly by a spring (not shown), which is built into the detector switch 8b.

The leaf spring 20b is interposed between the tip of the actuating device 8c and the point of the screw 7b. It can deflect in the direction the actuating device 8c travels and thus presses down on the actuating device 8c of the detector switch 8b when pressed by the screw 7b. The screw 7b and detector switch 8b are constructed such that the width L3 of the leaf spring 20b is larger than the diameter L4 of the actuating device 8c and/or the diameter L5 of the male thread of the screw 7b, as shown in FIGS. 7 and 9(b). Thus, even if there is a manufacturing error in positioning the screw 7b relative to the detector switch 8b, the error can be compensated and, therefore, the actuating device 8c can be pressed down reliably to turn the detector switch 8b on. When not pressed down by the screw 7b, the leaf spring 20b deflects upwardly, so as to maintain an open gap between the tip of the actuating device 8c and itself.

The screw 7b has a long and thin unthreaded portion 7b-1 under the head 7b-2 thereof, and around the unthreaded portion between its head and the hole 11b, is received a coil spring 21b, which forces the screw 7b upwardly, thereof to hold the screw 7b displaced from the detector switch 8b. Thus, the coil spring 21b helps the screw 7b hold on to the unit 1b even when the cover 6b is taken off or the unit 1b is turned upside down to replace the battery 2a. It also helps an operator dismount and mount the battery 2a one-handedly because the screw 7b holds on to the unit 1b.

As seen in FIG. 6, a ring 22b is provided around the unthreaded portion of the screw 7b, between the hole 11b and the cover projection 10b, so that the screw 7b does not fall out of the unit 1b.

Figure 8A:
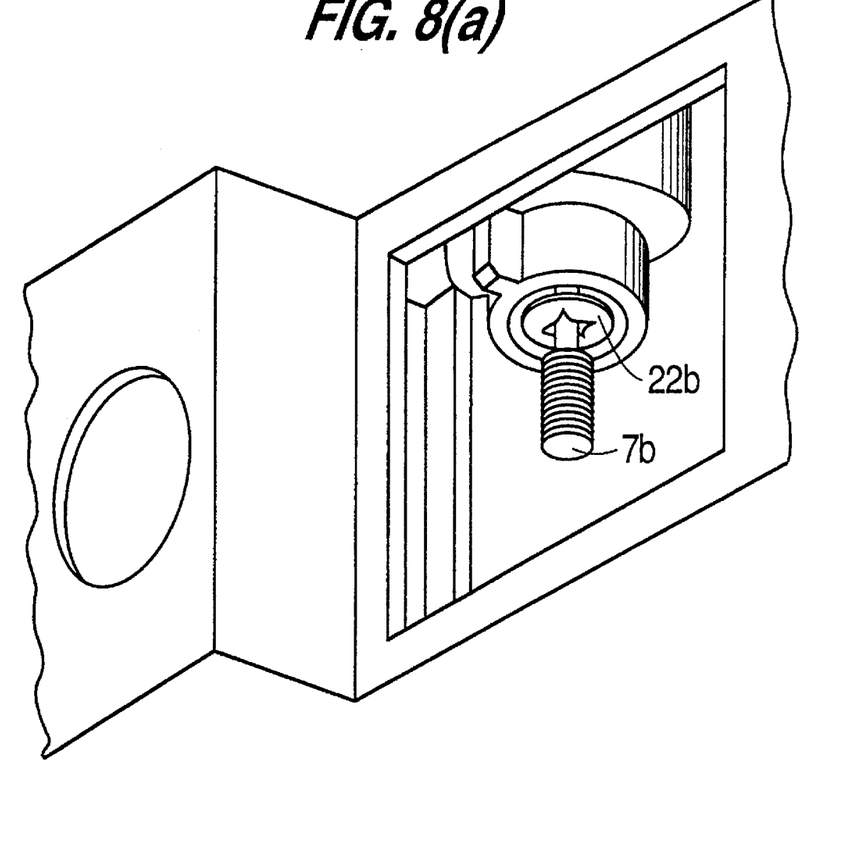
FIG. 8(a) is a perspective view of a ring 22b relative to a male thread of a screw 7b.

FIG. 8(a) is a perspective view of the ring 22b relative to the male thread of the screw 7b.

Figure 8B:
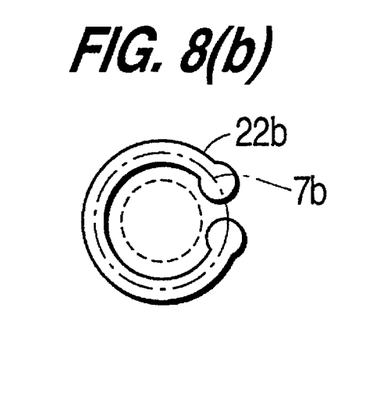
FIGS. 8(b) and 8(c) are views of two types of rings 22b relative to the screw 7b.
Figure 8C:
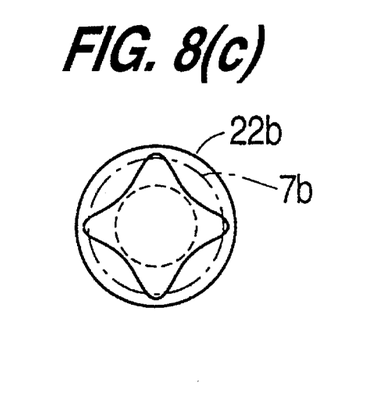

The male thread of the screw 7b is inserted into the ring 22b, which is made of an elastic resin or metal and which has a slit cut in the shape of a cross, as shown in FIG. 8(c). The ring 22b may also be a C-shaped ring, as shown in FIG. 8(b). The ring 22b is larger in its outer diameter than the diameter of the hole 11b and its dimensional relations to the screw 7b are as shown in FIG. 8(b), where a horizontal section of the male thread is shown by a broken line and that of the unthreaded portion of the screw 7b is shown by a chain (dashed) line. Being so constructed, the ring 22b can prevent the screw 7b from falling out of the hole 11b while still moving axially along the unthreaded portion of the screw 7b.

Figure 9A:
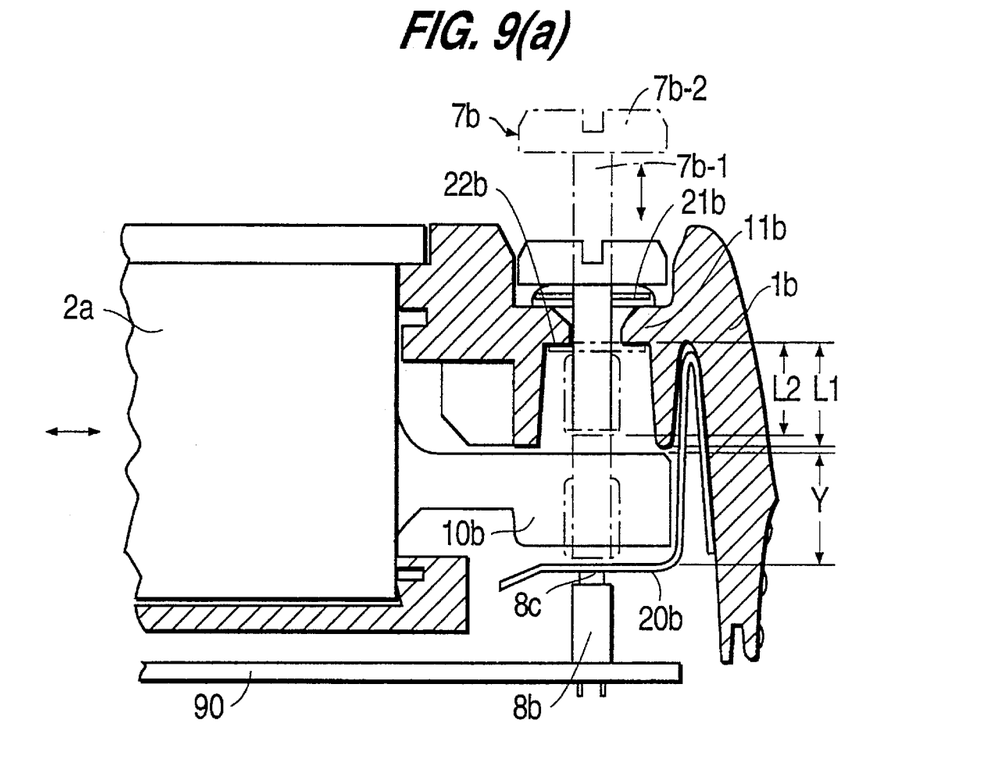
FIG. 9(a) is an enlarged sectional view taken from a side opposite to that shown in FIG. 6.
Figure 9B:
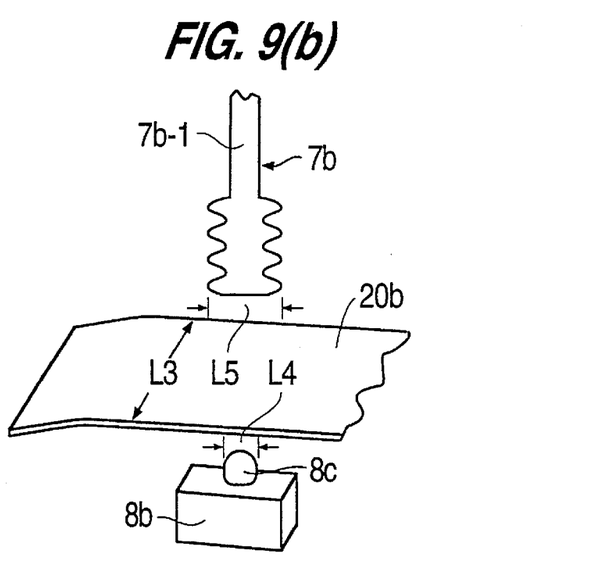
FIG. 9(b) is a perspective view of a leaf spring and associated elements.

FIG. 9(a) is an enlarged sectional view taken from a side opposite to that shown in FIG. 6. FIG. 9(b) is a perspective view and shows a dimensional relation between the leaf spring 20b, the male thread of the screw 7b and the actuating device 8c of the detector switch 8b. The width of the leaf spring 20b is larger than the diameter of the male thread of the screw 7b and/or the actuating device 8c. In FIG. 9(b), L3 is set larger than L4 and/or L5 to compensate for any manufacturing error in positioning the screw 7b relative to the detector switch 8b so that the actuating device 8c can be pressed down positively to turn the detector switch 8b on.

When the lengths L1, L2 and Y are in relation that L1>L2>Y, the ring 22b can be a C- or E-shaped ring which secures itself to the unthreaded portion of the screw 7b. To make the unit 1b thin, which causes Y>L2, the ring 22b should be a ring which is movable up and down along the unthreaded portion of the screw 7b. The ring 22b serves as a stopper to prevent the screw 7b from falling out when the screw 7b is loosened or when the female screw 9b of the projection 10b is worn out and enlarged.

Figure 10:
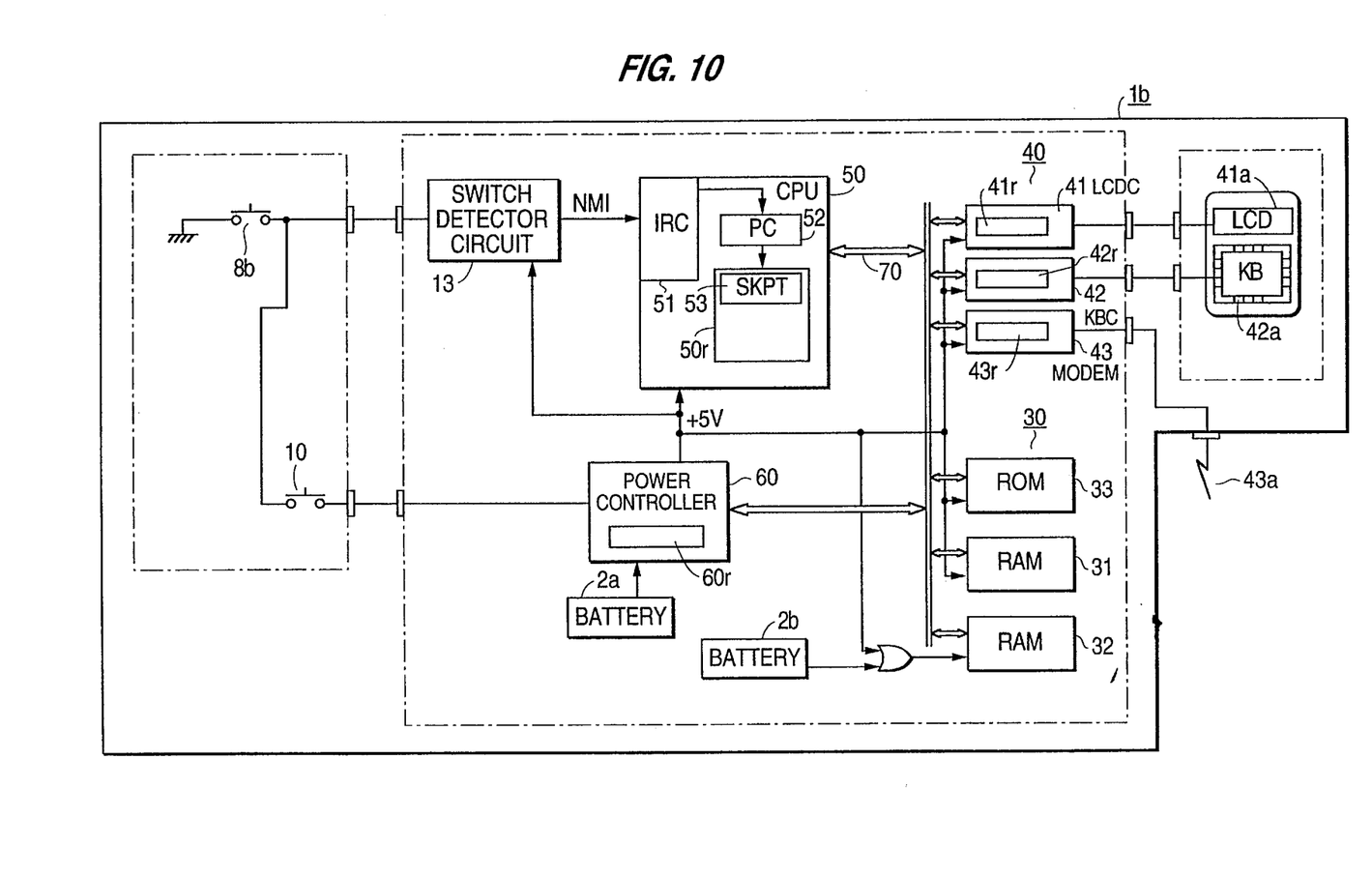
FIG. 10 is a functional block diagram illustrating a data processing unit including a data save apparatus of the present invention.

FIG. 10 is a functional block diagram illustrating a data processing unit including the data save apparatus of the present invention.

When a power-on switch 10 is turned on with the detector switch 8b turned on (i.e., closed), a ground level is applied to a power controller 60. Then, the power controller 60 supplies power (plus 5 volts) from the battery 2a to all the system components of the unit 1b, including a switch detector circuit 13, central processing unit (abbreviated to "CPU") 50, input-output controllers 40 and memory unit 30. The system components of the unit 1b are interconnected via a common bus 70.

The switch detector circuit 13 detects the turn-off of the detector switch 8b when the screw 7b is loosened and sends a non-maskable interrupt (NMI) signal to the CPU 50.

The CPU 50 executes an operating system (OS) 17, application program 14 and a later-explained suspend program 15. (See FIG. 11.) The CPU 50 also performs a later-explained NMI processing upon receipt of the NMI signal from the switch detector circuit 13 (i.e., of FIG. 10).

The input-output controllers 40 include an LCD controller (LCDC) 41, keyboard controller (KBC) 42, modem 43, etc. The controllers have control registers 41r, 42r and 43r, etc., for controlling a liquid crystal display (LCD) 41a, keyboard (KB) 42a, communication line 43a and other input/output devices. The memory unit 30 includes a read-only memory (ROM) 33, random-access memory (RAM) 31 and RAM 32. The power to the RAM 32 is backed up by another battery (e.g., a lithium- or cadmium-battery) 2b, i.e., supplied with power through a wired-OR gate from the outputs of the batteries 2a and 2b. The RAM 32 may be a non-volatile memory, e.g., an electrically erasable programmable read-only memory (EEPROM).

Figure 11:
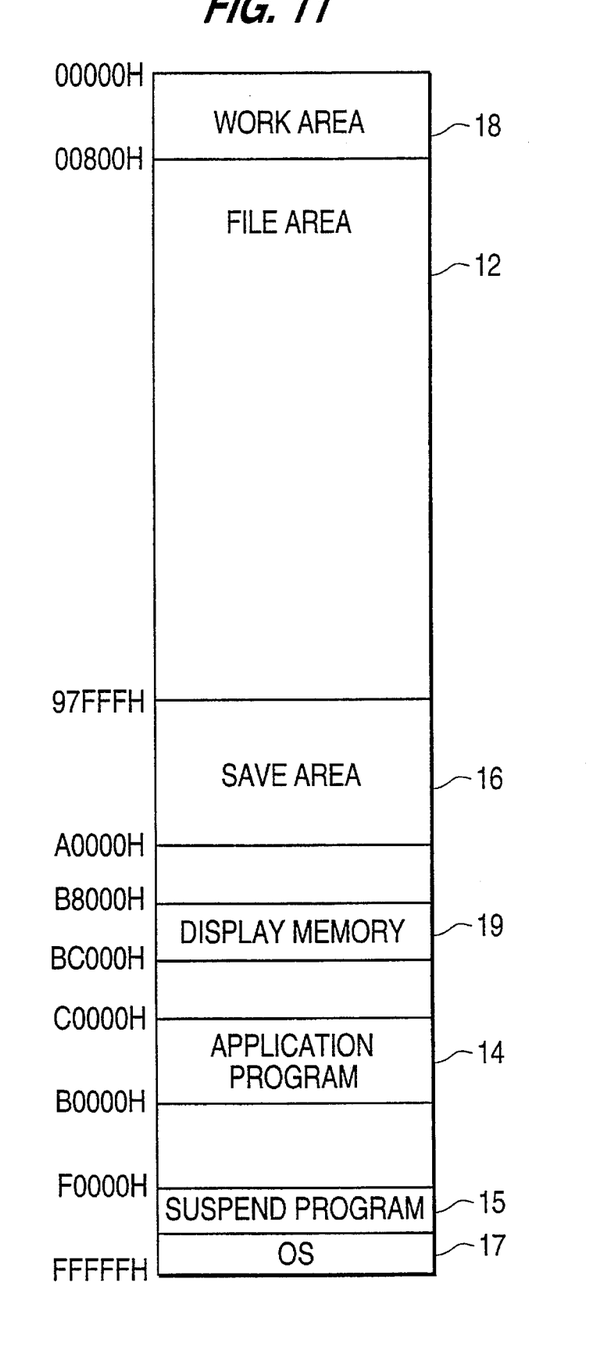
FIG. 11 is a memory map.

FIG. 11 is a memory map, showing memory locations assigned to the programs and work areas, etc.

A work area 18, which is provided in the RAM 31, stores data input from the keyboard 42a, intermediate processing results, etc.

When predetermined processing is completed for the data in the work area 18, the processed result is transferred to a file area 12, which is provided in the RAN 32. A save area 16, which is provided in the battery-backed up RAM 32, stores data saved by the suspend program 15. A display memory 19, which is provided in the RAM 31, stores data to be displayed on the LCD 41a. An application program 14, which is provided in the ROM 33, performs functions of the unit 1b (e.g., the hand held terminal HHT as described in U.S. Pat. No. 4,773,032). The suspend program 15 performs later-explained, suspend processing to save data required in the save area 16.

Figure 12:
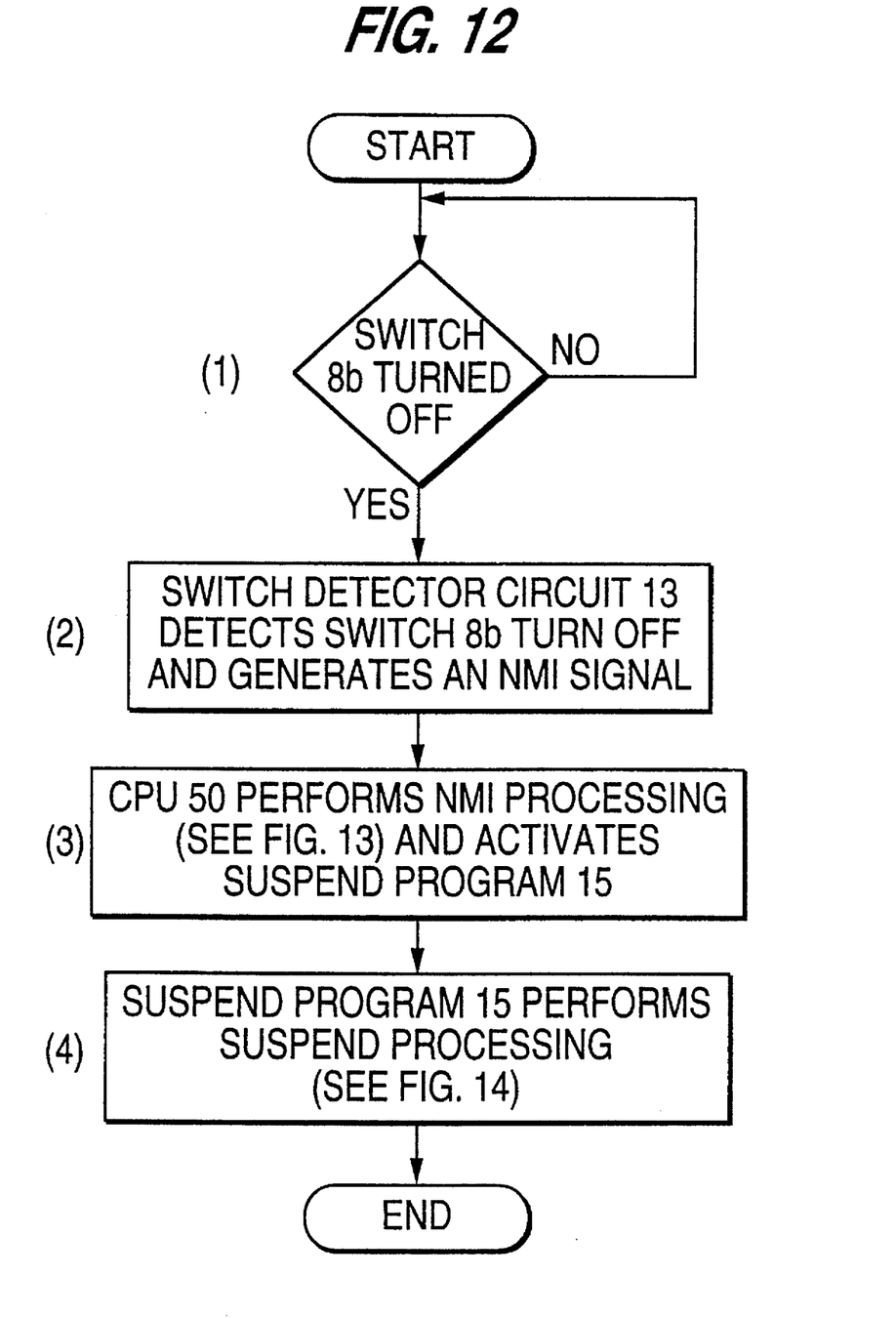
FIG. 12 is a flowchart illustrating a general operation of the suspend processing.

FIG. 12 is a flowchart illustrating the general operation of the suspend processing, as now explained:

(1) As the screw is loosened to remove the cover 6b and battery 2a, the actuating device 8c goes up, causing the detector switch 8b to turn off.

(2) The switch detector circuit 13 detects the switching transition of the detector switch 8b from on to off and sends an NMI signal to the CPU 50.

(3) On receipt of tile signal, the CPU 50 performs the NMI processing, by which it interrupts the application program 14 in progress and activates the suspend program 15. (See FIG. 13.)

(4) The suspend program 15 performs the suspend processing, by which it saves, in the save area 16, the contents of the control registers of the CPU 50 and the input-output controllers 40 in addition to data in the work area 18. (See FIG. 14.) The control registers hold control information for controlling the CPU 50 and the input-output controllers 40, and status information indicating the current state thereof. The suspend program 15 saves such control and status information in the save area 16 so that the program suspended (or interrupted) can be resumed exactly from the state in which the program was when suspended, including program status (e.g., instruction address) and input-output device status in progress.

Figure 13:
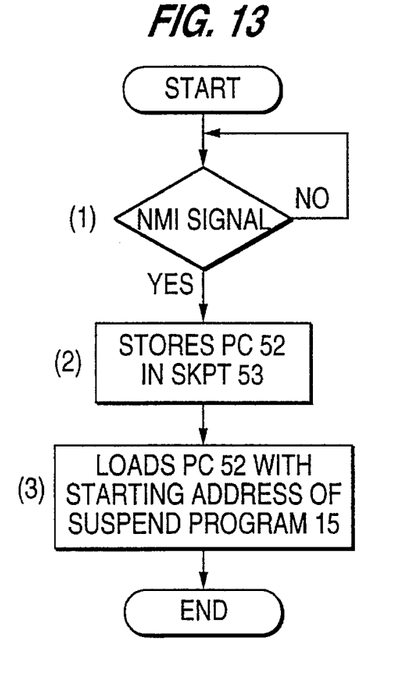
FIG. 13 is a flowchart illustrating the NMI processing.

FIG. 13 is a flowchart illustrating the NMI processing.

(1) An interrupt controller (abbreviated to "IRC") 51 of the CPU 50 checks to see if an NMI signal has been sent thereto.

(2) On receipt of the NMI signal, the IRC 51 stores the contents of a program counter (abbreviated to "PC") 52 into a stack pointer (abbreviated to "SKPT") 53. The PC 52 is a counter which holds the address of an instruction currently being executed and counts up when the instruction is executed. The SKPT 53 is a register for storing the instruction address of the interrupted program to be executed next when the interrupting program is completed.

(3) The IRC 51 loads the PC 52 with the starting address of the area where the suspend program 15 is stored.

Thus, the application program 14 is interrupted and the suspend program 15 is activated.

Figure 14:
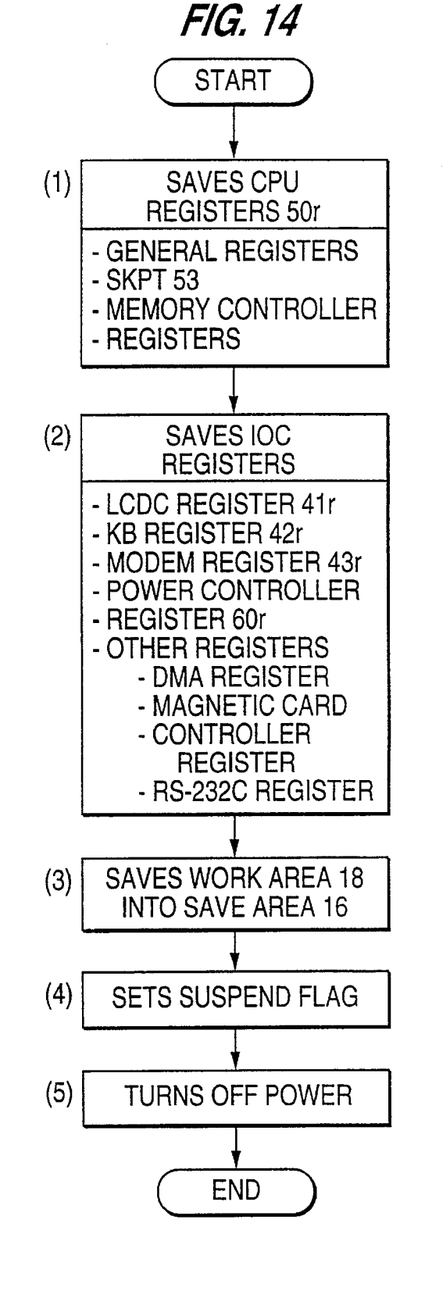
FIG. 14 is a flowchart illustrating the suspend processing.

FIG. 14 is a flowchart illustrating the suspend processing.

(1) The suspend program 15 saves the contents of CPU registers 50r into the save area 16 by executing a "Move" instruction, one by one, for the register contents of 2-byte length, for example. The CPU registers 50r include stack pointer (SKPT) 53, general registers and memory control registers (not shown).

(2) The suspend program 15 saves register contents of the input-output controllers (IOC) 40 into the save area 16. The control registers include LCDC register 41r, KBC register 42r, modem register 43r and power controller register 60r. The suspend program 15 also saves the register contents of other input-output controllers, including a direct memory access (DMA) register, a magnetic card controller register and a RS-232C register.

(3) The suspend program 15 saves the contents of the work area 18 into the save area 16.

(4) The suspend program 15 sets a suspend flag bit in a predetermined location of the save area 16. When the battery 2a is replaced and the suspended program is resumed, the flag bit shows that the suspend processing was performed previously.

(5) The suspend program 15 sets a power-off (PWR-OFF) bit in the power controller register 60r, which causes the power controller 60 to turn off power.

The present invention can apply to separate batteries as well as a battery pack as explained above, if housed in a unit and covered with a cover. It also applies to batteries contained in a cartridge having a projection similar to the projection 10b.

The present invention can also apply to a data processing unit in which data is processed in a non-volatile memory. In this case, the data can be preserved there, instead of being saved in a different memory, by controlling the non-volatile memory (or by controlling power supplied thereto on a last-on, first-off basis), for example, so that the data is not destroyed or lost when a battery is removed.

As is apparent from the above description, the present invention allows sufficient time for the unit 1b to complete saving or preserving data required for resuming the processing suspended by a removal of the battery 2a because it starts saving or preserving the data required when the detector switch 8b turns off and allows sufficient time before the screw 7b is loosened to permit the cover 6b and battery 2a to be taken off.

What is claimed is:

1. A data save apparatus of a data processing unit, which unit includes first storage means for storing data and main power supply means which is selectively connectable to the data processing unit for supplying power to the data processing unit and selectively removable therefrom with resultant cut off of the supply of power thereby to the data processing unit, said data save apparatus comprising:

securing means for selectively securing the main power supply means to the data processing unit in a first state and thereby maintaining the selective connection of the main power supply means to the data processing unit for supplying power thereto and for selectively releasing the main power supply means from the data processing unit in a second state and thereby permitting the actual removal of the main power supply means from the data processing unit, the securing means comprising a male screw movable from a first position in the first state through a transition stage to a second position in the second state and, the male screw requiring a first time interval to move from the transition stage to the second position in the second state;

second storage means for maintaining the storage of data therein when the supply of power from the main power supply means is cut off;

prediction means coupled to the male screw of the securing means for predicting when the male screw is moved from the first position to the transition stage, and producing a corresponding prediction output within the first time interval prior to actual removal of the removable power supply means and the cut off of the power supply thereby by detecting the transition of said securing means from the first state for producing the prediction output thereof; and data saving means, responsive to the prediction output, for saving data stored in the first storage means in the second storage means prior to actual removal of and the resultant cut off of the supply of power by the main power supply, the data saving means being operable in response to the prediction output, the data save operation requiring a second time interval which is less than the first time interval.

2. A data save apparatus as recited in claim 1, wherein:

the securing means further comprises a movable securing element, selectively movable to a securing position for securing the main power supply means to the data processing unit and selectively removable from the securing position thereby to permit selective removal of the main power supply means from the data processing unit, the male screw being received through a corresponding aperture in the element and engagable in a mating, threaded hole in the data processing unit and operable through selective first and second directions of rotation between the first and second positions which are axially displaced, the male screw engaging the element to the data processing unit in the first position and thereby fastening the element to the data processing unit and, in the second position, being released from engagement with the threaded hole in the data processing unit and permitting removal of the element; and the prediction means comprises a switch having an actuator which actuates the switch between first and second conditions, the actuator being positioned for engagement by the male screw as the male screw is selectively rotated for moving from the second to the first position thereof and being displaced at the first position of the male screw for actuating the switch to the first condition and being responsive to selective rotation of the male screw in the opposite direction and movement of the male screw from the first position and toward the second position thereof and prior to the male screw reaching the second position, for actuating the switch change from the first condition and to the second condition thereof, the prediction means responding to the switch change from the first and to the second condition for producing the prediction output.

3. A data save apparatus as recited in claim 1, wherein the data processing unit includes a compartment for receiving the main power supply and wherein:

the securing means further comprises a cover selectively movable to a position enclosing the compartment for securing the main power supply means therein and for removal therefrom to permit selective removal of the main power supply means from the compartment, the male screw being received through a corresponding aperture in the cover and engagable in a mating, threaded hole in the data processing unit and operable through selective first and second directions of rotation between the first and second positions which are axially displaced, the male screw engaging the cover to the data processing unit in the first position and thereby fastening the cover to the data processing unit and, in the second position, being released from engagement with the threaded hole in the data processing unit and permitting removal of the cover; and the prediction means comprises a switch having an actuator which actuates the switch between first and second conditions, the actuator being positioned for engagement by the male screw as the male screw is selectively rotated for moving from the second to the first position thereof and being displaced at the first position of the male screw for actuating the switch to the first condition and being responsive to selective rotation of the male screw in the opposite direction and movement of the male screw from the first position and toward the second position thereof and prior to the male screw reaching the second position, for actuating the switch change from the first condition and to the second condition thereof, the prediction means responding to the switch change from the first condition and to the second condition for producing the prediction output.

4. A data save apparatus according to claim 2, wherein the securing means further comprises a leaf spring having a first end fixed to the data processing unit and second end disposed intermediate the male screw and the actuator, the leaf spring resiliently urging the screw axially away from the actuator.

5. A data save apparatus as recited in claim 4, wherein the leaf spring is elongated and the second end thereof has a width dimension, transverse to the length thereof, which is greater than the corresponding dimension of the surface of the actuator and of the surface of the male screw which engages the actuator.

6. A data save apparatus as recited in claim 2, wherein:

the male screw includes a head and an integral, elongated shank, at least a portion of the shank having a male thread thereon and the shank having a first diameter and the head having a second diameter greater than the first diameter;

the hole provided in the data processing unit has a third diameter, intermediate the first and second diameters, for receiving the shank of the male screw therethrough and permitting axial movement of the shank of the male screw relatively thereto; and the female threaded hole of the securing element is positioned in alignment with the male screw-receiving hole of the data processing unit when the securing element is in the first position thereof, receiving the male screw therethrough;

the holding means further comprises an element having a female threaded hole therein and positionable in alignment with the male screw-receiving hole in the housing of the data processing unit, the male screw being received through the hole in the data processing unit and threadingly engaging the female threaded hole in the securing element and when selectively rotated to the first position thereof, secures the securing element to the data processing unit.

7. A data save apparatus as recited in claim 3, wherein:

the male screw includes a head and an integral, elongated shank, at least a portion of the shank having a male thread thereon and the shank having a first diameter and the head having a second diameter greater than the first diameter;

the hole provided in the data processing unit has a third diameter, intermediate between the first and second diameters, for receiving the shank of the male screw therethrough and permitting axial movement of the shank of the male screw relatively thereto; and the female threaded hole of the cover is positioned in alignment with the male screw-receiving hole of the data processing unit when the cover is in the first position thereof, receiving the male screw therethrough;

the holding means further comprises an element having a female threaded hole therein and positionable in alignment with the male screw-receiving hole in the housing of the data processing unit, the male screw being received through the hole in the data processing unit and threadingly engaging the female threaded hole in the cover and when selectively rotated to the first position thereof, secures the cover to the data processing unit.

8. A data save apparatus as recited in claim 6, wherein:

the male screw shank further comprises an unthreaded axial portion between the head and the male threads thereon, the unthreaded axial portion of the male screw being of an axial length and the male threaded portion thereof being displaced thereby from the head of the male screw such that the unthreaded portion remains within the hole in both first and second positions of the male screw.

9. A data save apparatus as recited in claim 8, wherein the securing means further comprises:

a ring having an aperture and received around the unthreaded portion of the male screw shank, when the male screw is inserted through the hole in the data processing unit, the ring thereby being seated between the male threaded portion of the male screw shank and the hole and the ring having an outer diameter larger than the diameter of the hole and an inner diameter smaller than the diameter of the threaded portion of the male screw and thereby restraining axial removal of the male screw from within the hole in the data processing unit.

10. A data save apparatus of a data processing unit, which unit includes first storage means for storing data, and main power supply means which is selectively connectable to the data processing unit for supplying power to the data processing unit and selectively removable therefrom with resultant cut off of the supply of power thereby to the data processing unit, said data save apparatus comprising:

securing means for releasably securing the removable power supply means to the data processing unit, the securing means having a first state in which the removable power supply means is secured to the data processing unit and thereby for maintaining a connection of the removable power supply means to the data processing unit for supply power thereto and a second state in which the removable power supply means is released from the data processing unit and correspondingly is removable therefrom, the securing means comprising a male screw movable from a first position in the first state through a transition stage to a second position in the second state, the male screw requiring a first time interval for moving from the transition stage to the second position in the second state;

prediction means coupled to the male screw of the securing means for predicting when the male screw is moved from the first position to the transition stage, and producing a corresponding prediction output prior to actual removal of the removable power supply means and the cut off of the power supply thereby by detecting transition of said securing means from the first state;

storage control means, responsive to the prediction output, for maintaining storage of data, stored in the main storage means, when the supply of power from the power supply means to the data processing unit is cut off; and data saving means for saving data prior to the securing means reaching the second state thereof, the data save operation requiring a second time interval for completion, the second time interval being less than the first time interval.

11. A data save apparatus according to claim 2, wherein the securing means further comprises a leaf spring having a first end fixed to the data processing unit and second end disposed intermediate the male screw and the actuating device, the leaf spring being resiliently biased to urge the male screw away from the actuating device.

12. A data save apparatus as recited in claim 7, wherein:

the male screw further comprises an unthreaded axial portion between the head and the male threads of the male screw, the unthreaded axial portion of the male screw being of an axial length and the male threaded portion thereof being disposed thereby from the head of the male screw such that the unthreaded portion remains within the hole in both the fully advanced and fully retracted positions of the male screw.

13. A data save apparatus as recited in claim 7, further comprising:

a ring defining an aperture and received around the unthreaded portion of the male screw, when the male screw is inserted through the hole and thereby seeded between the male threaded portion of the male screw and the element in which the hole is formed, the ring having an outer diameter larger than the diameter of the hole and an inner diameter smaller than the diameter of the threaded portion of the male screw and thereby blocking axial removal of the screw from within the hole.

* * * * *

UNITED STATES PATENT AND TRADEMARK OFFICE
CERTIFICATE OF CORRECTION

PATENT NO. : 5,519,871
DATED : May 21, 1996
INVENTOR(S) : Yuji SHIMODA

It is certified that error appears in the above-indentified patent and that said Letters Patent is hereby corrected as shown below:

Col. 1, line 64, after "processing" insert --,--.

Col. 2, line 58, after "are" insert --top--.

Col. 3, line 26, delete "thereof".

Col. 5, line 18, change "RAN" to --RAM--.

Signed and Sealed this

Thirteenth Day of August, 1996

Attest:

BRUCE LEHMAN

Attesting Officer      Commissioner of Patents and Trademarks